United States Patent
Li et al.

(10) Patent No.: US 11,811,864 B2
(45) Date of Patent: Nov. 7, 2023

(54) NETWORK CONNECTION METHOD AND DEVICE FOR TRAINING PARTICIPANT END OF COMMON TRAINING MODEL

(71) Applicant: BEIJING BYTEDANCE NETWORK TECHNOLOGY CO., LTD., Beijing (CN)

(72) Inventors: Longyijia Li, Beijing (CN); Cheng Chen, Beijing (CN); Di Wu, Beijing (CN); Chenliaohui Fang, Beijing (CN); Peng Zhao, Beijing (CN); Junyuan Xie, Beijing (CN); Yixiang Chen, Beijing (CN); Liangchao Wu, Beijing (CN); Long Chang, Beijing (CN); Xiaobing Liu, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 0 days.

(21) Appl. No.: 17/886,771

(22) Filed: Aug. 12, 2022

(65) Prior Publication Data
US 2022/0394085 A1 Dec. 8, 2022

Related U.S. Application Data

(63) Continuation of application No. PCT/CN2021/080881, filed on Mar. 15, 2021.

(30) Foreign Application Priority Data

Apr. 8, 2020 (CN) .......................... 202010270128.5

(51) Int. Cl.
G06F 15/173 (2006.01)
H04L 67/104 (2022.01)
(Continued)

(52) U.S. Cl.
CPC .......... *H04L 67/104* (2013.01); *H04L 41/044* (2013.01); *H04L 41/0661* (2023.05)

(58) Field of Classification Search
CPC ..... H04L 67/104; H04L 41/04; H04L 41/044; H04L 41/0654; H04L 41/0668; H04L 41/0672
(Continued)

(56) References Cited

U.S. PATENT DOCUMENTS 9,357,003 B1 * 5/2016 Eiriksson ............. H04L 67/104
10,498,817 B1 * 12/2019 Morris ................ H04L 67/1004
(Continued)

FOREIGN PATENT DOCUMENTS

CN 105991325 A 10/2016
CN 106411629 A 2/2017
(Continued)

OTHER PUBLICATIONS

International Patent Application No. PCT/CN2021/080881; Int'l Search Report; dated Jun. 23, 2021; 3 pages.
(Continued)

*Primary Examiner* — Bharat Barot
(74) *Attorney, Agent, or Firm* — BakerHostetler

(57) ABSTRACT

A network connection method and device for a training participant of a joint training model are provided, the training participant operates in a master-worker mode. The method includes: acquiring communication state information of a worker, the communication state information indicating a communication connection phase that the worker is in; acquiring communication state information of a target worker as target communication state information, where the target worker includes a peer node corresponding to the worker, and the peer node belongs to a different training participant of the joint training model; and resetting,
(Continued)

in response to determining that the target communication state information does not match the communication state information of the worker, a communication connection phase that the worker is in.

9 Claims, 4 Drawing Sheets

(51) Int. Cl.
*H04L 41/044* (2022.01)
*H04L 41/0659* (2022.01)

(58) Field of Classification Search
USPC .................................................. 709/223–224
See application file for complete search history.

(56) References Cited

U.S. PATENT DOCUMENTS

| | | | | |
|---|---|---|---|---|
| 11,075,980 | B2 * | 7/2021 | Bacher | H04L 67/1001 |
| 2016/0050262 | A1 * | 2/2016 | Kumar | H04L 67/10 |
| | | | | 709/204 |
| 2017/0339005 | A1 * | 11/2017 | Yuan | H04L 41/0668 |
| 2019/0173739 | A1 | 6/2019 | Cui et al. | |
| 2019/0394083 | A1 | 12/2019 | Sglavo et al. | |
| 2020/0394552 | A1 * | 12/2020 | Ganapavarapu | H04L 9/3247 |
| 2021/0097477 | A1 * | 4/2021 | Zhang | G06Q 10/08 |

FOREIGN PATENT DOCUMENTS

| | | |
|---|---|---|
| CN | 107025205 A | 8/2017 |
| CN | 108229528 A | 6/2018 |
| CN | 109039733 A | 12/2018 |
| CN | 109547388 A | 3/2019 |
| CN | 109729111 A | 5/2019 |
| CN | 109981750 A | 7/2019 |
| CN | 110598870 A | 12/2019 |
| CN | 110635944 A | 12/2019 |
| CN | 110688230 A | 1/2020 |
| CN | 111510327 A | 8/2020 |
| EP | 1986337 A1 | 10/2008 |
| EP | 2439885 A1 | 4/2012 |
| EP | 2677796 A1 | 12/2013 |
| JP | 2004-320423 A | 11/2004 |
| WO | WO 2016/041153 A1 | 3/2016 |

OTHER PUBLICATIONS

European Patent Application No. 21784197.2; Extended Search Report; dated Jul. 7, 2023; 15 pages.

* cited by examiner

NETWORK CONNECTION METHOD AND DEVICE FOR TRAINING PARTICIPANT END OF COMMON TRAINING MODEL

The present application is a continuation application of International Application No. PCT/CN2021/080881, titled "NETWORK CONNECTION METHOD AND DEVICE FOR TRAINING PARTICIPANT END OF COMMON TRAINING MODEL", filed on Mar. 15, 2021, which claims priority to Chinese Patent Application No. 202010270128.5, titled "NETWORK CONNECTION METHOD AND DEVICE FOR TRAINING PARTICIPANT END OF COMMON TRAINING MODEL", filed on Apr. 8, 2020, both of which are incorporated herein by reference in their entireties.

FIELD

The embodiments of the present disclosure relate to the field of computer technologies, and in particular to a network connection method and a network connection apparatus for a training participant of a joint training model.

BACKGROUND

The rapid development of artificial intelligence technology greatly increases the scale of model training and popularizes parallel model training. In parallel design, the Master-Worker mode is generally used, in which the Master is responsible for receiving and distributing tasks (such as training tasks), and the Worker is responsible for processing subtasks.

In the process of jointly training a model by multiple training participants, various failures, such as network failures, trainer failures, and parameter server failures, are inevitable. A related approach is usually to set a service recovery point in advance, and perform data recovery from the recovery point in the event of a failure.

SUMMARY

A network connection method and a network connection apparatus for a training participant of a joint training model are provided according to the embodiments of the present disclosure.

In a first aspect, a network connection method for a training participant of a joint training model is provided according to an embodiment of the present disclosure. The training participant operates in a master-worker mode, and the method includes: acquiring communication state information of a worker, the communication state information indicating a communication connection phase that the worker is in; acquiring communication state information of a target worker as target communication state information, where the target worker includes a peer node corresponding to the worker, and the peer node belongs to a different training participant of the joint training model; and resetting, in response to determining that the target communication state information does not match the communication state information of the worker, the communication connection phase that the worker is in.

In some embodiments, the method further includes generating, in response to determining that the communication connection phase that the worker is in is changed, new communication state information indicating the changed communication connection phase that the worker is in.

In some embodiments, the resetting, in response to determining that the target communication state information does not match the communication state information of the worker, the communication connection phase that the worker is in includes: resetting the communication connection phase of the worker to a connection establishment phase before the communication connection phase, in response to determining that the target communication state information indicates that the target worker is in the connection establishment phase before the communication connection phase and the communication state information of the worker indicates that the worker is in the communication connection phase.

In a second aspect, a network connection apparatus for a training participant of a joint training model is provided according to an embodiment of the present disclosure. The training participant operates in a master-slave mode, and the apparatus includes: a first acquisition unit, configured to acquire communication state information of a worker, the communication state information indicating a communication connection phase that the worker is in; a second acquisition unit, configured to acquire communication state information of a target worker as target communication state information, where the target worker includes a peer node corresponding to the worker, and the peer node belongs to a different training participant of the joint training model; and a reset unit, configured to reset, in response to determining that the target communication state information does not match the communication state information of the worker, the communication connection phase that the worker is in.

In some embodiments, the apparatus further includes a generation unit. The generation unit is configured to generate, in response to determining that the communication connection phase that the worker is in is changed, new communication state information indicating the changed communication connection phase that the worker is in.

In some embodiments, the reset unit is further configured to: reset the communication connection phase of the worker to a connection establishment phase before the communication connection phase, in response to determining that the target communication state information indicates that the target worker is in the connection establishment phase before the communication connection phase and the communication state information of the worker indicates that the worker is in the communication connection phase.

In a third aspect, a network connection system for a training participant of a joint training model is provided according to an embodiment of the present disclosure. The system includes: a worker, configured to acquire local communication state information of the worker, where the communication state information indicates a communication connection phase that the worker is in; acquire communication state information of a target worker as target communication state information, where the target worker includes a peer node corresponding to the worker, and the peer node belong to a different training participant of the joint training model; terminate the process in response to determining the target communication state information does not match the local communication state information of the worker; and set the communication connection phase that the worker is in to a preset phase in response to reception of information instructing restart sent by a master corresponding to the worker, and update the local communication state information of the worker; and the master, configured to send, in response to determining that there is a worker that actively terminated the process, the information instructing restart to the worker that actively terminated the process.

In some embodiments, the system further includes: a parameter server, configured to generate, in response to detecting an operational failure of a parameter server, failure prompt information indicating a failure of the parameter server; and the master is further configured to send a communication termination request to a master of another training participant of the joint training model in response to detection of presence of the failure prompt information indicating the failure of the parameter server; and disconnect a communication connection corresponding to the communication termination request in response to reception of a confirmation information corresponding to the communication termination request.

In some embodiments, the communication termination request is further used to instruct to stop the training process of the joint training model; and the master is further configured to: restore the training process of the joint training model from a target checkpoint in response to reception of the confirmation information corresponding to the communication termination request.

In a fourth aspect, a server is provided according to an embodiment of the present disclosure, the server includes: one or more processors; and a storage device storing one or more programs. The one or more programs, when executed by the one or more processors, cause the one or more processors to implement the method according to any one of the implementations of the first aspect.

In a fifth aspect, a computer-readable medium having a computer program stored thereon is provided according to an embodiment of the present disclosure. The program, when executed by a processor, implements the method according to any one of the implementations of the first aspect.

A network connection method and a network connection apparatus for a training participant of a joint training model are provided according to the embodiments of the present disclosure. The training participant operates in a master-worker mode. The method includes acquiring communication state information of a worker, where the communication state information indicates a communication connection phase that the worker is in; acquiring communication state information of a target worker as target communication state information, where the target worker includes a peer node corresponding to the worker, and the peer node belong to a different training participant of the joint training model; and resetting the communication connection phase that the worker is in in response to determining that the target communication state information does not match the communication state information of the worker. In this way, the data loss caused by the network failure can be reduced to the greatest extent.

BRIEF DESCRIPTION OF THE DRAWINGS

Other features, objects and advantages of the present disclosure will become more apparent by reading the detailed description of non-limiting embodiments made with reference to the following drawings.

DESCRIPTION OF EMBODIMENTS

Figure 1:
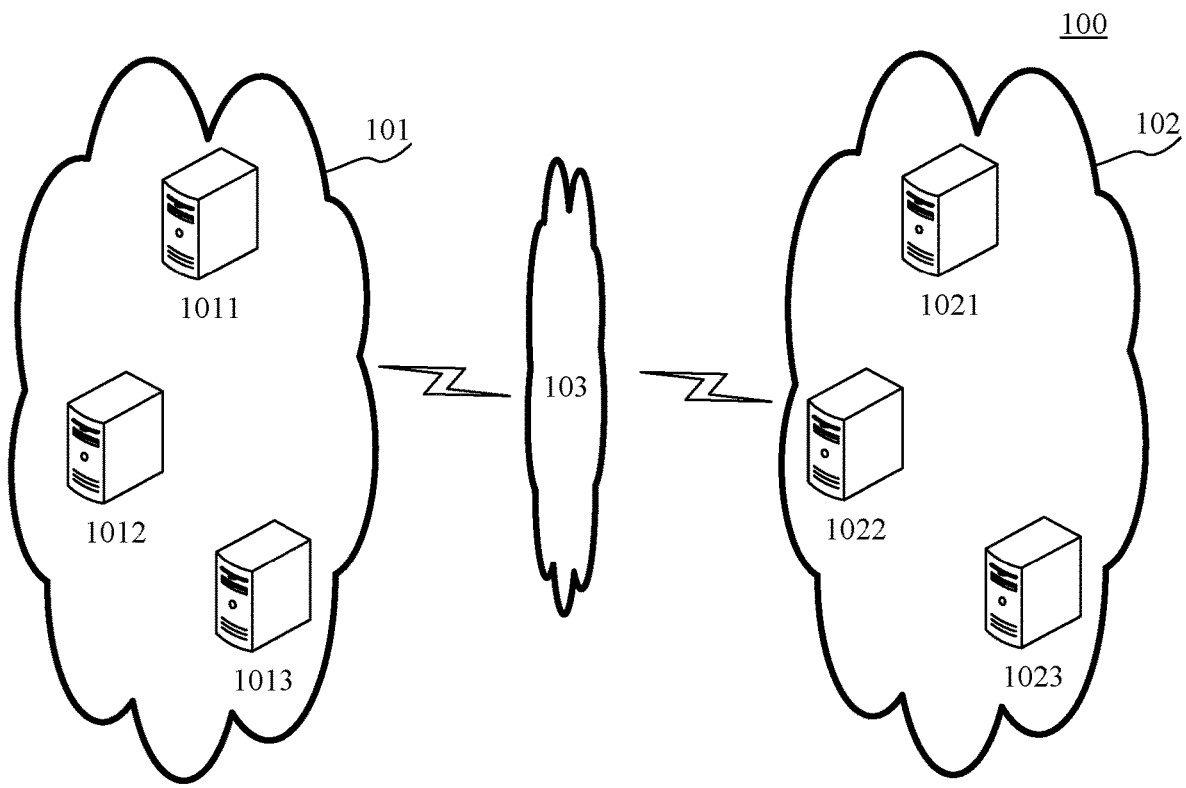
FIG. 1 is a schematic diagram illustrating an exemplary system architecture to which an embodiment of the present disclosure is applicable.

The present disclosure will be described in more detail below in conjunction with the embodiments with reference to the accompanying drawings. It should be understood that the specific embodiments described herein are only used to explain rather than limiting the present disclosure. In addition, it is to be noted that, for the convenience of description, only the parts related to the present disclosure are shown in the drawings.

It is to be noted that the embodiments in the present disclosure and the features of the embodiments may be combined with each other in the case of no conflict. The present disclosure will be described in detail below in conjunction with the embodiments with reference to the accompanying drawings.

FIG. 1 illustrates an exemplary architecture 100 to which a network connection method for a training participant of a joint training model or a network connection apparatus for a training participant of a joint training model of the present disclosure is applicable.

As shown in FIG. 1, the system architecture 100 may include server clusters 101 and 102, and a network 103. The network 103 is a medium for providing a communication link between the server clusters 101 and 102. The network 103 may include various types of connection, such as wired connection, wireless communication links, fiber-optics, cables, or the like.

The server clusters 101 and 102 may be servers that provide various services, such as servers for training models having a distributed or federated learning framework. The server cluster 101 may include a master 1011 and workers 1012 and 1013. The server cluster 102 may include a master 1021 and workers 1022 and 1023. The server clusters 101 and 102 may function as different participants in federated learning to jointly train a model using their respective training samples.

It should be noted that the server may be hardware or software. In a case that the server is hardware, the server may be implemented as a distributed server cluster composed of multiple servers, or may be implemented as a single server; and in a case that the server is software, the server may be implemented as multiple software or software modules (for example, software or software modules for providing distributed services), or may be implemented as a single software or software module, which is not limited in the present disclosure.

It is to be noted that the network connection method for a training participant of a joint training model according to the embodiments of the present disclosure is generally performed by the workers (for example, the servers 1012 and 1013 or the servers 1022 and 1023). Correspondingly, the network connection apparatus for a training participant of a joint training model is generally provided in the workers (for example, the servers 1012 and 1013 or the servers 1022 and 1023).

It should be understood that the number of networks and servers in FIG. 1 is merely illustrative. There may be any number of networks and servers depending on the implementation requirements.

Figure 2:
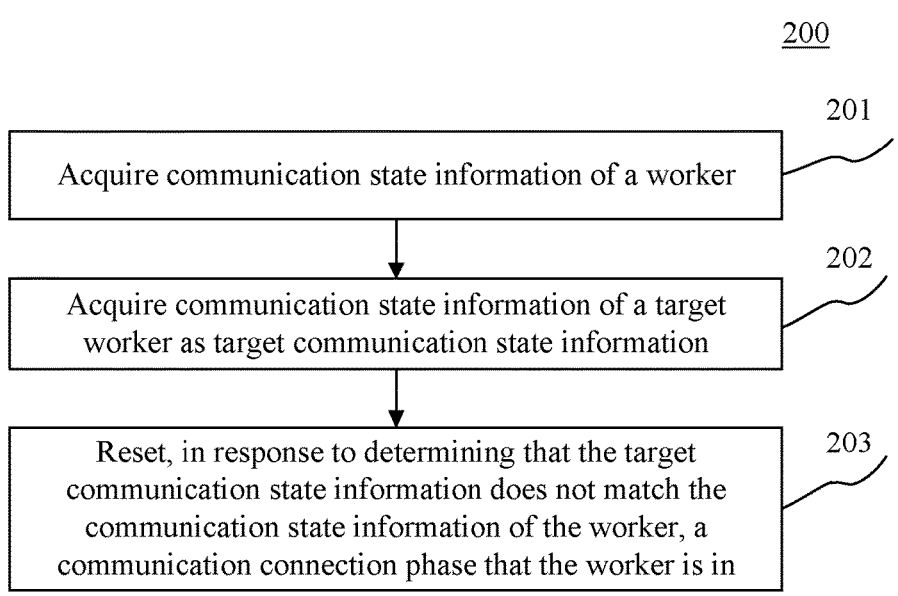
FIG. 2 is a flowchart of a network connection method for a training participant of a joint training model according to an embodiment of the present disclosure.

Reference is made to FIG. 2, which illustrates a flow 200 of a network connection method for a training participant of a joint training model according to an embodiment of the present disclosure. The network connection method for a training participant of a joint training model includes the following steps 201 to 203.

In step 201, communication state information of a worker is acquired.

In this embodiment, the execution body (the server 1011 or 1012 shown in FIG. 1) of the network connection method for a training participant of a joint training model may acquire local communication state information of the worker through wired connection or wireless connection. The communication state information may indicate a communication connection phase that the worker is in. The execution body may be the master or the worker in the server cluster. Generally, the worker may locally acquire the communication state information of the worker. Then, the worker may further report the communication state information to a master belonging to the same cluster after acquiring the communication state information of the worker. In this way, the master of the server cluster may acquire the communication state information of respective workers from the workers in the cluster.

In this embodiment, the communication connection phase may include, for example, a connection establishment phase, a communication phase, and a disconnection phase. The communication phase may generally refer to a data transmission phase. The connection establishment phase and disconnection phase may generally refer to a preparation phase before data transmission and a disconnection phase after data transmission, respectively. The disconnection phase may include operations such as disconnecting a pipeline and removing a socket.

In step 202, communication state information of a target worker is acquired as target communication state information.

In this embodiment, the execution body may acquire the communication state information of the target worker through wired connection or wireless connection. The target worker may include a peer node corresponding to the execution subject in the joint training model. The peer node may belong to a different training participant of the joint training model. The joint training model may include various machine learning models that are trained using a distributed or Federated Learning (FL) framework. Peer nodes may be, for example, nodes paired between different participants in a decentralized joint training model.

In this embodiment, the worker may acquire the communication state information of the peer node serving as the target worker as the target communication state information through peer-to-peer connection. After acquiring the target communication state information, the worker may further report the target communication state information to the master belonging to the same cluster. In this way, the master of the server cluster may acquire the communication state information of the peer nodes corresponding to respective workers from the workers in the cluster.

In step 203, in response to determining that the target communication state information does not match the communication state information of the worker, the communication connection phase that the worker is in is reset.

In this embodiment, in response to determining that the target communication state information acquired in step 202 does not match the communication state information of the worker, the execution body may reset the communication connection phase that the worker is in through various ways. As an example, the execution body may generally reset the communication connection phase that the worker is in to be consistent with the communication connection phase that the node indicated by the target communication state information is in.

In some optional implementations of this embodiment, in response to determining that the target communication state information indicates that the target worker is in the connection establishment phase before the communication connection phase and the communication state information of the worker indicates that the worker is in the communication connection phase, the execution body may reset the communication connection phase of the worker to the connection establishment phase before the communication connection phase. As an example, when the number of communication timeouts between a worker in the server cluster serving as a first training participant of the joint training model and a worker in the server cluster serving as a second training participant of the joint training model reaches a preset threshold, the process of the communication requester (for example, the worker in the server cluster serving as the first training participant) exits due to a communication failure. When the master in the server cluster serving as the first training participant is informed of the communication failure of the worker, the server sets a new worker in the server cluster serving as the first training participant and set the communication connection phase of the new worker to be the connection establishment phase. In this case, when the network communication is restored, the peer node (that is, the worker in the server cluster serving as the second training participant) that restores the connection to the worker that has exited due to the communication failure is still in the communication phase as the communication receiver of the previous communication. In response to determining that the communication phases of the two workers do not match, the peer node interrupts the process. Then, the master corresponding to the peer node may reset the peer node and set the peer node to be in the connection establishment phase, such that the peer node and the newly set worker performs connection and pairing.

Based on the above optional implementation, the master in the server cluster serving as the training participant may delegate codes for determining the local communication state and interrupting the process due to an exception to workers for execution, thereby reducing the policy complexity of the upper-layer master, which improves the efficiency of execution.

Figure 3:
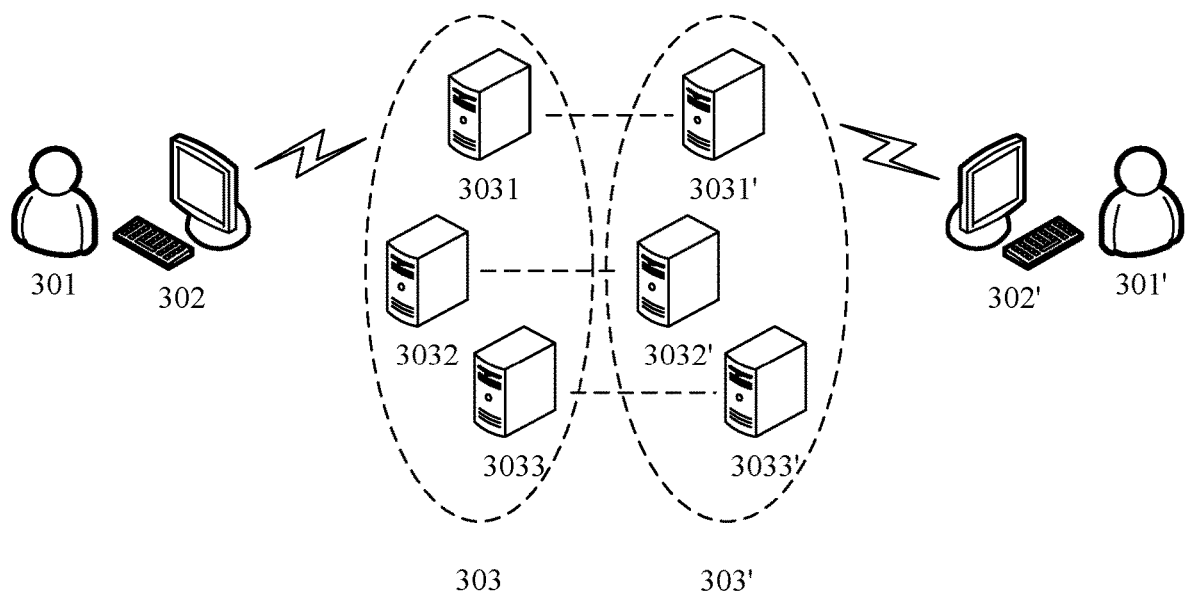
FIG. 3 is a schematic diagram of an application scenario of a network connection method for a training participant of a joint training model according to an embodiment of the present disclosure.

Reference is made to FIG. 3, which is a schematic diagram of an application scenario of a network connection method for a training participant of a joint training model according to an embodiment of the present disclosure. In the application scenario of FIG. 3, a user 301 and a user 301' perform machine learning training by using the federated learning framework through a terminal 302 and a terminal 302', respectively. A server 3031 serving as the master in the above server cluster 303 is paired with a server 3031' serving as the master in the server cluster 303'. A server 3032 serving as the worker in the server cluster 303 is paired with a server 3032' serving as a worker in the server cluster 303'. A server 3033 serving as the worker in the server cluster 303 is paired with a server 3033' serving as the worker in the server cluster 303'. The above servers 3032 and 3033 and servers 3032' and 3033' may be used as trainers. When the process of the server 3032 is abnormally exited due to a failure, the server 3031 serving as the master resets the server 3032 and set the server 3032 to be in the "connection establishment phase". The node server 3032' corresponding to the server 3032 locally acquires the communication state information indicating that the server 3032' is in the "communication phase". Moreover, the node server 3032' may further acquire the communication state information used by the target node server 3032 for indicating that the target node server is in the "connection establishment phase". In response to determining that there is a mismatch between the above communication state information, the node server 3032' disconnects the connection. The node server 3031' resets the node server 3032' and sets the server 3032' to be in the "connection establishment phase".

Currently, one conventional technology is to determine whether to roll back the service to a preset recovery point only according to the local communication state, resulting in a large data loss during network failure recovery. However, in the method according to the above embodiments of the present disclosure, the communication phase of the unmatched worker is reset by matching with the communication connection phase of the target worker based on the communication state of the worker. Since data loss occurs only in a relatively short time period after the communication failure, data loss caused by network failures can be reduced to the greatest extent compared with data recovery from the preset recovery point.

Figure 4:
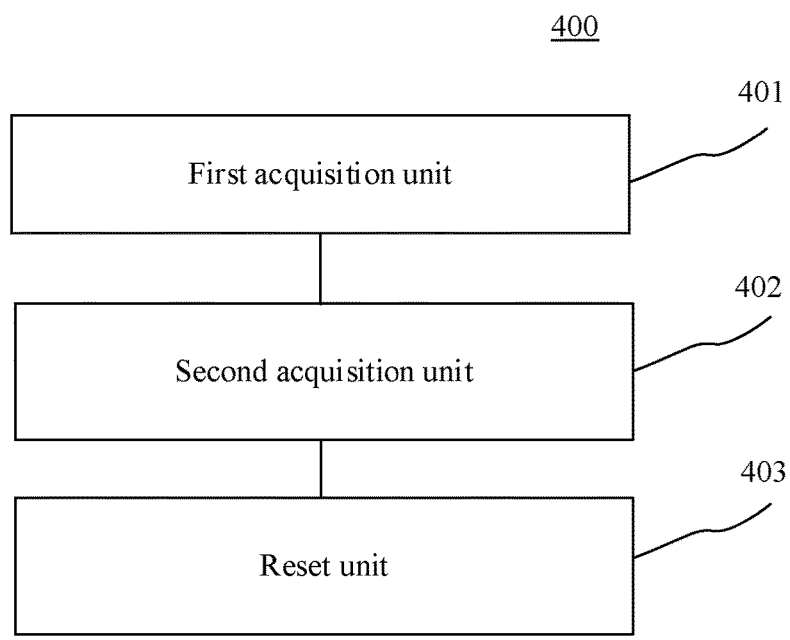
FIG. 4 is a schematic diagram of a network connection apparatus for a training participant of a joint training model according to an embodiment of the present disclosure.

Reference is made to FIG. 4, as an implementation of the method shown in the above drawings, a network connection apparatus for a training participant of a joint training model is provided according to an embodiment of the present disclosure. The apparatus embodiment corresponds to the above method embodiment shown in FIG. 2, where the training participant adopts the master-worker mode. The apparatus is applicable to various electronic devices.

As shown in FIG. 4, a network connection apparatus 400 for a training participant of a joint training model according to this embodiment includes a first acquisition unit 401, a second acquisition unit 402, and a reset unit 403. The first acquisition unit 401 is configured to acquire communication state information of a worker, where the communication state information indicates a communication connection phase that the worker is in. The second acquisition unit 402 is configured to acquire communication state information of a target worker as target communication state information, where the target worker includes a peer node corresponding to the worker, and the peer node belong to a different training participant of the joint training model. The reset unit 403 is configured to reset, in response to determining that the target communication state information does not match the communication state information of the worker, the communication connection phase that the worker is in.

In this embodiment, in the network connection apparatus 400 for a training participant of a joint training model, for the processing of the first acquisition unit 401, the second acquisition unit 402 and the reset unit 403 and the technical effects brought by the processing, reference can be made to the related descriptions of steps 201, 202 and 203 in the corresponding embodiment shown in FIG. 2, and the details are not repeated here.

In some optional implementations of this embodiment, the apparatus 400 for controlling network connection between nodes may further include a generation unit (not shown in the drawings). The generation unit may be configured to generate, in response to determining that the communication connection phase that the worker is in is changed, new communication state information indicating the changed communication connection phase that the worker is in.

In some optional implementations of this embodiment, the reset unit 403 may be further configured to: reset the communication connection phase of the worker to a connection establishment phase before the communication connection phase in response to determining that the target communication state information indicates that the target worker is in the connection establishment phase before the communication connection phase and the communication state information of the worker indicates that the worker is in the communication connection stage.

In the apparatus according to the embodiments of the present disclosure, the first acquisition unit 401 acquires communication state information of a worker, where the communication state information indicates a communication connection phase that the worker is in; then, the second acquisition unit 402 acquires communication state information of a target worker as target communication state information, where the target worker includes a peer node corresponding to the worker, and the peer node belong to a different training participant of the joint training model; and finally, the reset unit 403 resets the communication connection phase that the worker is in in response to determining that the target communication state information does not match the communication state information of the worker. In this way, the data loss caused by the network failure can be reduced to the greatest extent.

Figure 5:
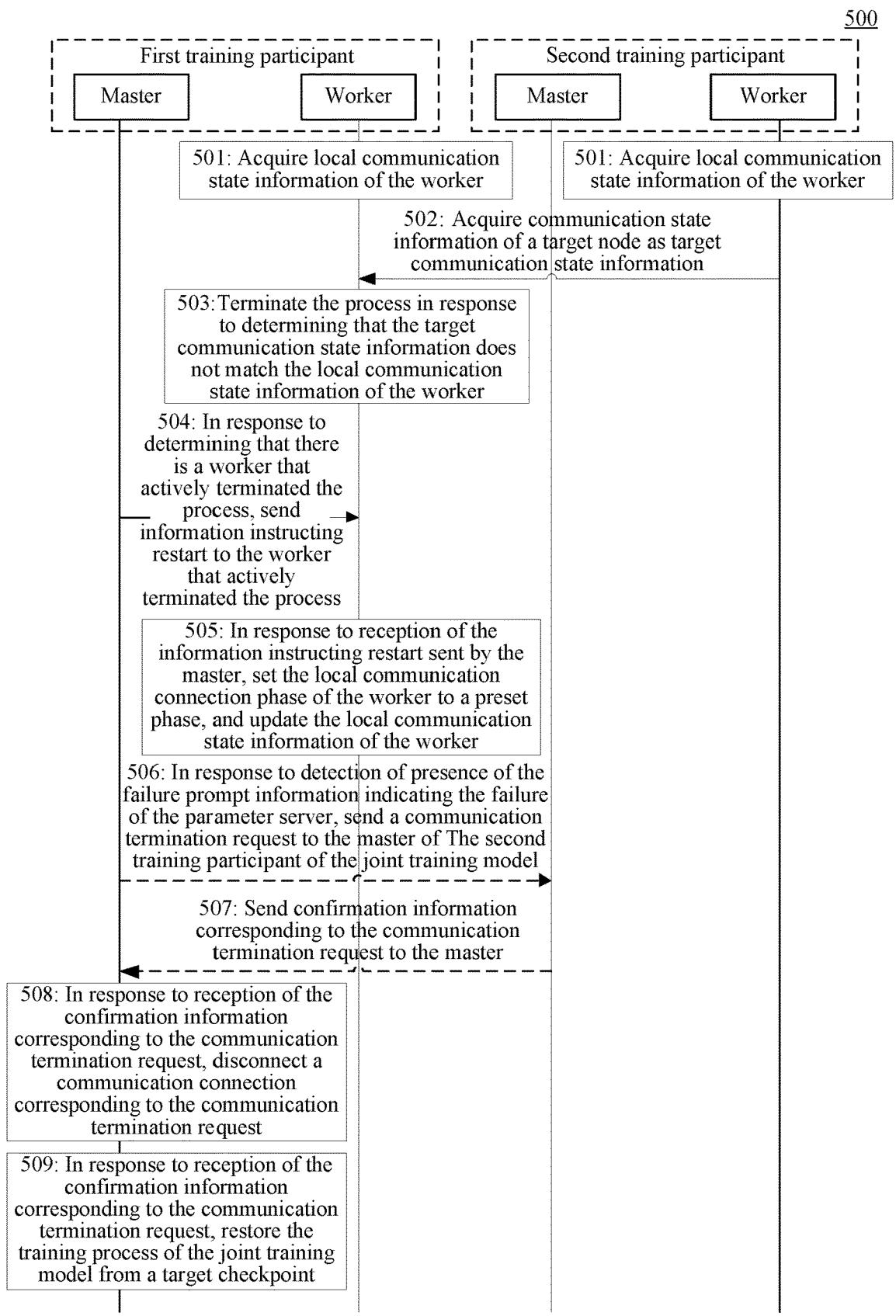
FIG. 5 is a sequence diagram of interactions between various devices in a network connection system for a training participant of a joint training model according to an embodiment of the present disclosure.

Reference is made to FIG. 5, which illustrates a sequence 500 of interactions between various devices in a network connection system for a training participant of a joint training model according to an embodiment of the present disclosure. The network connection system for a training participant of a joint training model may include workers (for example, 1012, 1013, 1022, and 1023 shown in FIG. 1) and masters (for example, 1011 and 1021 shown in FIG. 1). The worker may be configured to acquire local communication state information of the worker, where the communication state information indicates a communication connection phase that the worker is in; acquire communication state information of a target worker as target communication state information, where the target worker may include a peer node corresponding to the worker, and the peer node belongs to a different training participant of the joint training model; terminate the process in response to determining that the target communication state information does not match the local communication state information of the worker; set the communication connection phase that the worker is in to a preset phase in response to reception of information instructing restart sent by a master corresponding to the worker, and update the local communication state information of the worker. The master may be configured to send, in response to determining that there is a worker that actively terminated the process, information instructing restart to the worker that actively terminated the process.

In some optional implementations of this embodiment, the system may further include: a parameter server. The parameter server may be configured to generate failure prompt information indicating a failure of the parameter server. The master may further be configured to send a communication termination request to a master of another training participant of the joint training model in response to detection of presence of the failure prompt information indicating the failure of the parameter server; and disconnect a communication connection corresponding to the communication termination request in response to reception of a confirmation information corresponding to the communication termination request.

In some optional implementations of this embodiment, the communication termination request may further be used to instruct to stop the training process of the joint training model. The master may further be configured to restore the training process of the joint training model from a target checkpoint in response to reception of the confirmation information corresponding to the communication termination request.

As shown in FIG. 5, in step 501, a worker acquires local communication state information of the worker.

In step 502, the worker acquires communication state information of a target node as target communication state information.

In step 503, in response to determining that the target communication state information does not match the local communication state information of the worker, the worker terminates the process.

In step 504, in response to determining that there is a worker that actively terminated the process, the master sends information instructing restart to the worker that actively terminated the process.

In step 505, in response to reception of the information instructing restart sent by the master corresponding to the worker, the worker sets the local communication connection phase of the worker to a preset phase, and updates the local communication state information of the worker.

In this embodiment, the preset phase may be a preset communication connection phase. The communication connection phase may be the same as the "communication connection phase" in step 201 of the foregoing embodiment, and is not described in detail here.

The above steps 501 to 505 correspond to steps 201 to 203 in the foregoing embodiment (the execution body is the worker) and their optional implementations, and the above descriptions for steps 201 to 203 and their optional implementations are also applicable to steps 501-505, which are not described in detail here.

In some optional implementations of this embodiment, in response to detecting an operational failure, a parameter server (not shown in the drawings) communicatively connected to the master may generate failure prompt information indicating a failure of the parameter server.

In these implementations, the parameter server may be various servers for storing parameters of the joint training model. The joint training model may be the same as the joint training model described in the above embodiments. Since the parameters stored in the parameter server are updated with the model training process, the parameter server has a state. Therefore, when the parameter server fails, the entire joint training model fails and needs to be reset as a whole.

Based on the above optional implementation, in step 506, in response to detection of presence of the failure prompt information indicating the failure of the parameter server, the master may send a communication termination request to the master of another training participant of the joint training model.

In these implementations, in response to detection of presence of the failure prompt information indicating that the parameter server of the joint training model is in a fault state, the master (for example, the server 1011 shown in FIG. 1) corresponding to the execution body (for example, the server 1012 shown in FIG. 1) of the network connection method for a training participant of the joint training model may send the communication termination request to the master of another participant of the joint training model in various ways. The communication termination request may include, for example, a FIN (finish) packet in TCP (Transmission Control Protocol, transmission control protocol).

Based on the foregoing optional implementation, optionally, the communication termination request may further be used to instruct to stop the training process of the joint training model. The master may send the communication termination request to a peer node of the joint training model (that is, the master of another participant of the joint training model) to stop a trainer functioning as a worker corresponding to the peer node.

Based on the above optional implementation, in step 507, the peer node sends confirmation information corresponding to the communication termination request to the master.

In these implementations, the above peer node may include the master of the participant of the common training model. The confirmation information may include an ACK (Acknowledge character) of the TCP.

Based on the above optional implementation, in step 508, in response to reception of the confirmation information corresponding to the communication termination request, the master disconnects a communication connection corresponding to the communication termination request.

In these implementations, in response to reception of the confirmation information corresponding to the communication termination request, the above execution body may disconnect the communication connection corresponding to the communication termination request.

In some optional implementations of this embodiment, in step 509, in response to reception of the confirmation information corresponding to the communication termination request sent by the peer node of the joint training model (that is, the master of another participant of the joint training model), the master may further restore the training process of the joint training model from a target checkpoint. The target checkpoint may be the latest checkpoint to minimize data loss.

Based on the above optional implementation, training can be restored from the target checkpoint when the parameter server fails, so that a restore method with the least data loss can be selected according to different failure states.

The network connection system for a training participant of a joint training model is provided according to the above embodiments of the present disclosure. First, the worker acquires the local communication state information of the worker, where the communication state information indicates the communication connection phase that the worker is in. Then, the worker acquires the communication state information of the target worker as the target communication state information, where the target worker includes the peer node corresponding to the worker, the peer node belongs to a different training participant of the joint training model. Next, in response to determining that the target communication state information does not match the local communication state information of the worker, the worker terminates the process. Next, in response to determining that there is a worker that actively terminated the process, the master sends information instructing restart to the worker that actively terminated the process. Finally, in response to reception of the information instructing restart sent by the master corresponding to the worker, the worker sets the communication connection phase of the worker to the preset phase, and updates the local communication state information of the worker. Therefore, from one aspect, the data loss caused by network failure is reduced to the greatest extent, and from another aspect, the policy complexity of the upper-layer master is reduced, and the execution efficiency is improved.

Figure 6:
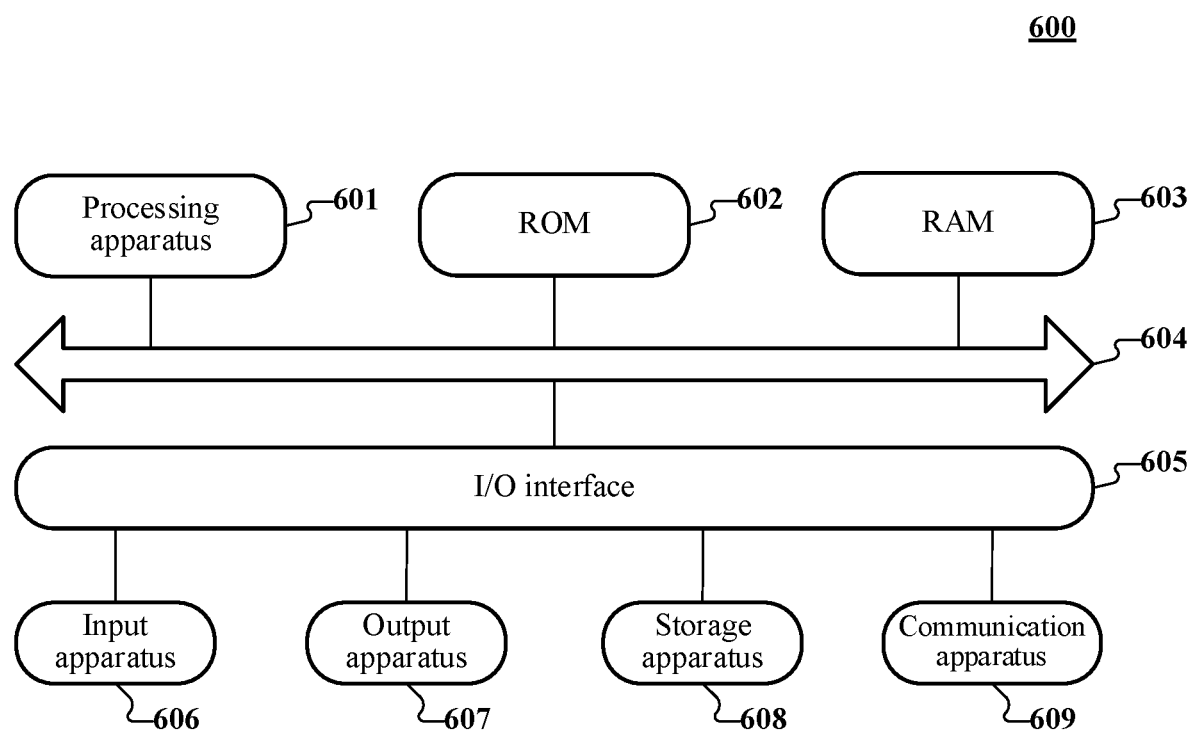
FIG. 6 is a schematic structural diagram of an electronic device suitable for implementing embodiments of the present disclosure.

Reference is made to FIG. 6, which is a schematic structural diagram of an electronic device 600 (for example, the server in FIG. 1) for implementing the embodiments of the present disclosure. The electronic device shown in FIG. 6 is only an example, and should not bring any limitation to the function and scope of the embodiments of the present disclosure.

As shown in FIG. 6, the electronic device 600 may include a processing apparatus 601, such as a central processing unit or a graphics processor, which can execute various appropriate actions and processes based on a program stored in a Read Only Memory (ROM) 602 or a program loaded from a storage apparatus 608 into a Random Access Memory (RAM) 603. In the RAM 603, various programs and data required by the electronic device 600 for operation are further stored. The processing apparatus 601, the ROM 602, and the RAM 603 are connected to each other through a bus 604. An input/output (I/O) interface 605 is also connected to the bus 604.

Generally, the following may be connected to the I/O interface 605: an input apparatus 606 such as a touch screen, a touch pad, a keyboard, a mouse, a camera, a microphone, an accelerometer, a gyroscope, an output apparatus 607 such as a Liquid Crystal Display (LCD), a speaker, a vibrator, a storage apparatus 608 such as a magnetic tape, a hard disk, and a communication apparatus 609. Based on the communication apparatus 609, the electronic device 600 may communicate with other devices through wired or wireless communication to exchange data. Although FIG. 6 shows the electronic device 600 including various apparatuses, it should be understood that not all shown apparatuses are required to be implemented or included. The shown apparatuses may be replaced by other apparatuses, or more or less apparatuses may be included. Each block in FIG. 6 may represent one or multiple devices as required.

Specifically, the processes described with reference to flow charts, may be implemented as a computer software program according to an embodiment of the present disclosure. For example, a computer program product is provided according to an embodiment of the present disclosure, the computer program product includes a computer program embodied on a computer readable medium. The computer program includes program codes for performing the method shown in the flowchart. In such embodiments, the computer program may be downloaded and installed from the network through the communication apparatus 609, installed from the storage apparatus 608, or installed from the ROM 602. The computer program, when being executed by the processing apparatus 601, performs functions defined in the method according to the embodiments of the present disclosure.

It should be noted that the computer readable medium according to the embodiments of present disclosure may be a computer readable signal medium or a computer readable storage medium or any combination of the two. The computer readable storage medium may include, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random Access Memory (RAM), a Read Only Memory (ROM), an Erasable Programmable Read Only Memory (EPROM or a flash memory), an optical fiber, a portable Compact Disk Read-Only Memory (CD-ROM), an optical storage device, a magnetic storage device, or any suitable combination of the foregoing. In the present disclosure, the computer readable storage medium may be any tangible medium containing or storing a program, where the program may be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium may send, transmit or transfer programs used by an instruction execution system, apparatus or device or used in combination therewith. The program codes included in the computer readable medium may be transferred through any proper medium including, but not limited to, an electric wire, an optical cable, RF (Radio Frequency), and the like, or any suitable combination of the foregoing.

The above-mentioned computer-readable medium may be included in the above server; or may exist alone without being assembled into the server. The computer-readable medium carries one or more programs, which, when executed by the server, cause the server to: acquire communication state information of a worker, the communication state information indicating a communication connection phase that the worker is in; acquiring communication state information of a target worker as target communication state information, where the target worker includes a peer node corresponding to the worker, and the peer node belongs to a different training participant of the joint training model; and reset, in response to determining that the target communication state information does not match the communication state information of the worker, the communication connection phase that the worker is in.

The computer program codes for performing the operations according to the embodiments of the present disclosure may be written in one or more programming languages or a combination of the one or more programming languages. The programming languages include, but are not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowchart and block diagrams in the drawings illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the drawings. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The units involved in the embodiments of the present disclosure may be implemented in a software manner, and may also be implemented in a hardware manner. The described units may also be provided in the processor, for example, it may be described as: a processor, including a first acquisition unit, a second acquisition unit, and a reset unit. The names of these units do not constitute a limitation on the units themselves under certain circumstances. For example, the first acquisition unit may also be described as "a unit for acquiring local communication state information of the worker, where the communication status information indicates the communication connection phase the worker is in".

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

The invention claimed is:

1. A network connection method for a training participant of a joint training model, the training participant operating in a master-worker mode, and the method comprising:
   acquiring communication state information of a worker of the training participant, the communication state information indicating a communication connection phase that the worker is in;
   acquiring communication state information of a target worker as target communication state information, wherein the target worker comprises a peer node corresponding to the worker, and the peer node belongs to a different training participant of the joint training model;
   resetting, in response to determining that the target communication state information does not match the communication state information of the worker, the communication connection phase that the worker is in; and
   wherein the training participant and the different training participant are configured to jointly train a model using their respective training samples, wherein a plurality of server clusters connected via communication links serve as the training participant and the different training participant, wherein each of the training participant and the different training participant comprises a master and at least one worker, and wherein the communication connection phase comprises a connection establishment phase of preparing for data transmission, a communication phase of transmitting data, and a disconnection phase after data transmission.

2. The method according to claim 1, further comprising:
   generating, in response to determining that the communication connection phase that the worker is in is changed, new communication state information indicating the changed communication connection phase that the worker is in.

3. The method according to claim 1, wherein the resetting, in response to determining that the target communication state information does not match the communication state information of the worker, the communication connection phase that the worker is in comprises:
   resetting the communication connection phase of the worker to be the connection establishment phase before the communication phase, in response to determining that the target communication state information indicates that the target worker is in the connection establishment phase before the communication phase and the communication state information of the worker indicates that the worker is in the communication phase.

4. A network connection apparatus for a training participant of a joint training model, the training participant operating in a master-slave mode, and the apparatus comprising:
   one or more processors; and
   a memory configured to store one or more programs;
   wherein when the one or more programs are executed by the one or more processors, the one or more processors are caused to perform operations of:
   acquiring communication state information of a worker of the training participant, the communication state information indicating a communication connection phase that the worker is in;
   acquiring communication state information of a target worker as target communication state information, wherein the target worker comprises a peer node corresponding to the worker, and the peer node belongs to a different training participant of the joint training model;
   resetting, in response to determining that the target communication state information does not match the communication state information of the worker, the communication connection phase that the worker is in; and
   wherein the training participant and the different training participant are configured to jointly train a model using their respective training samples, wherein a plurality of server clusters connected via communication links serve as the training participant and the different training participant, wherein each of the training participant and the different training participant comprises a master and at least one worker, and wherein the communication connection phase comprises a connection establishment phase of preparing for data transmission, a communication phase of transmitting data, and a disconnection phase after data transmission.

5. The apparatus according to claim 4, wherein the one or more processors are also caused to perform operations of:
   generating, in response to determining that the communication connection phase that the worker is in is changed, new communication state information indicating the changed communication connection phase that the worker is in.

6. The apparatus according to claim 4, wherein the resetting, in response to determining that the target communication state information does not match the communication state information of the worker, the communication connection phase that the worker is in comprises:

resetting the communication connection phase of the worker to be the connection establishment phase before the communication phase, in response to determining that the target communication state information indicates that the target worker is in the connection establishment phase before the communication phase and the communication state information of the worker indicates that the worker is in the communication phase.

7. A network connection system for a training participant of a joint training model, comprising:

a worker, configured to acquire local communication state information of the worker of the training participant, wherein the communication state information indicates a communication connection phase that the worker is in; acquire communication state information of a target worker as target communication state information, wherein the target worker comprises a peer node corresponding to the worker, and the peer node belong to a different training participant of the joint training model; terminate the process in response to determining that the target communication state information does not match the local communication state information of the worker; and set the communication connection phase that the worker is in to a preset phase in response to reception of information instructing restart sent by a master of the training participant corresponding to the worker, and update the local communication state information of the worker;

the master, configured to send, in response to determining that there is a worker that actively terminated the process, the information instructing restart to the worker that actively terminated the process; and wherein the training participant and the different training participant are configured to jointly train a model using their respective training samples, wherein a plurality of server clusters connected via communication links serve as the training participant and the different training participant, wherein each of the training participant and the different training participant comprises a master and at least one worker, and wherein the communication connection phase comprises a connection establishment phase of preparing for data transmission, a communication phase of transmitting data, and a disconnection phase after data transmission.

8. The system according to claim 7, further comprising:

a parameter server, configured to generate, in response to detecting an operational failure of a parameter server, failure prompt information indicating a failure of the parameter server; and the master is further configured to send a communication termination request to the master of another training participant of the joint training model in response to detection of presence of the failure prompt information indicating the failure of the parameter server; and disconnect a communication connection corresponding to the communication termination request in response to reception of a confirmation information corresponding to the communication termination request.

9. The system according to claim 8, wherein the communication termination request is further used to instruct to stop the training process of the joint training model; and the master is further configured to:

restore the training process of the joint training model from a target checkpoint in response to reception of the confirmation information corresponding to the communication termination request.

* * * * *